(12) United States Patent
Kang et al.

(10) Patent No.: US 8,599,809 B2
(45) Date of Patent: Dec. 3, 2013

(54) ROUTING METHOD FOR WIRELESS MESH NETWORKS AND WIRELESS MESH NETWORK SYSTEM USING THE SAME

(75) Inventors: Young Myoung Kang, Seoul (KR); Chong Kwon Kim, Seoul (KR); Joon Soo Lee, Yongin (KR)

(73) Assignee: SNU R&DB Foundation, Seoul (KR)

( * ) Notice: Subject to any disclaimer, the term of this patent is extended or adjusted under 35 U.S.C. 154(b) by 112 days.

(21) Appl. No.: 13/243,663

(22) Filed: Sep. 23, 2011

(65) Prior Publication Data
US 2012/0134347 A1 May 31, 2012

(30) Foreign Application Priority Data
Nov. 26, 2010 (KR) ........................ 10-2010-0119038

(51) Int. Cl.
*H04W 84/02* (2009.01)
(52) U.S. Cl.
USPC ......................................... 370/338; 370/406

(58) Field of Classification Search
USPC ................................................... 370/338, 406
See application file for complete search history.

(56) References Cited

U.S. PATENT DOCUMENTS

| 7,248,841 B2 * | 7/2007 | Agee et al. ............. 455/101 |
| 8,363,744 B2 * | 1/2013 | Agee et al. ............. 375/267 |
| 2008/0070510 A1 * | 3/2008 | Doppler et al. ............. 455/69 |

* cited by examiner

*Primary Examiner* — Phuc Tran

(57) ABSTRACT

In the wireless mesh network including a sender, a receiver, and a plurality of access points disposed between the sender and the receiver, available transmission paths between the sender and the receiver are determined; transmission expected values are calculated for the transmission paths; and a transmission path having a minimum transmission expected value is set as an actual transmission path. The transmission expected value is a sum of expected transmission counts, which is a reciprocal of multiplication of forward transmission success rate and backward transmission success rate of a communication link between the nodes disposed on the transmission paths. When an access point can transmit a packet concurrently with another access point, the expected transmitted count is reduced by half.

6 Claims, 5 Drawing Sheets

ROUTING METHOD FOR WIRELESS MESH NETWORKS AND WIRELESS MESH NETWORK SYSTEM USING THE SAME

CROSS-REFERENCE TO RELATED APPLICATIONS

This application claims priority under 35 U.S.C. §119 to Korean Patent Application No. 10-2010-0119038, filed on Nov. 26, 2010, in the Korean Intellectual Property Office, the disclosure of which is incorporated herein by reference in its entirety.

TECHNICAL FIELD

The present invention relates to a routing method for wireless mesh networks and a wireless mesh network system using the same, and more particularly, a routing method for wireless mesh networks capable of acquiring a high throughput through opportunistic concurrent transmissions and a wireless mesh network system using the same.

BACKGROUND

Recent proliferation of IEEE 802.11 WLANs (Wireless local area networks) stems from its attractive features such as low chipset cost, ease of deployment, and sufficient bandwidth. As IEEE 802.11 WLANs becomes a dominant wireless access technology, it requires more efficient use of scarce wireless resources.

Distributed Coordination Function (DCF), the most popular MAC protocol for IEEE 802.11 WLANs, is very simple and its distributed operations show good performance in most environment. DCF which is based on CSMA/CA (Carrier Sense Multiple Access/Collision Avoidance) prohibits concurrent transmissions in order to avoid packet collisions and harmful interferences.

However, this basic collision protection scheme (CSMA/CA) may not fully utilize the wireless resources in terms of spatial reuse due to its conservative medium access control. If we adjust the transmission order and relative signal strength, we can successfully transmit multiple packets without the collision and channel error. We call this Capture Effect.

Previous wireless NICs (Network Interface Card) enables the PHY capture when an intended signal arrives until the middle of the preamble time of an interference signal. Of course, the SINR (Signal to Interference plus Noise Ratio) value of the intended signal must satisfy the required capture threshold. Recent MIM (Message in Message)-capable NICs such as Athelos increases the PHY capture probability by using enhanced preamble detection functionality. MIM-capable NICs can capture the intended signal with higher SINR ($\approx 10$ dB) even if the intended signal arrives after the preamble time of an interference signal.

This is shown in FIG. 1. FIG. 1A shows PHY capture, and FIG. 1B shows MIM, respectively.

As shown in FIG. 1A, when an intended signal having high SINR of approximately 10 dB arrives within the preamble time of an interference signal, the intended signal can be captured.

With MIM function, an intended signal can be captured even though it arrives after the preamble time of an interference signal, as shown in FIG. 1B.

U.S. Pat. No. 5,987,033 is the related art for maximizing the PHY capture using MIM function. In U.S. Pat. No. 5,987,033, there are disclosed a receiver and a method for operating the receiver, for a station in a wireless local area network using a common wireless communication channel and employing a CSMA/CA protocol includes various modes. In normal mode, the receiver follows typical states in order to detect a message and demodulate data from the message properly. Meanwhile, a process implements a message-in-message (MIM) mode when an energy increase above a specified level is detected. While in the MIM mode, if a carrier is detected, the energy increase is caused by a new message; otherwise, the energy increase is caused by an interfering station. If the carrier is detected, the receiver begins retraining so that it can start receiving the new message as soon as the first message ends.

SUMMARY

An exemplary embodiment of the present invention provides a routing method for a sender for transmitting a packet in a wireless mesh network including the sender, a receiver, and a plurality of access points disposed between the sender and the receiver, the method comprising: determining available transmission paths between the sender and the receiver; calculating expected transmission values for the transmission paths when there are two or more available transmission paths; and, setting the transmission path having a minimum expected transmission value among the transmission paths as an actual transmission path of the packet, wherein, in the calculating of the expected transmission values, a sum of expected transmission counts, the expected transmission count being a reciprocal of multiplication of forward transmission success rate and backward transmission success rate of a communication link between the nodes disposed on the transmission paths, is calculated—the node means the sender, the receiver, or the access point—; and wherein, when a signal to interference plus noise ratio (SINR) value of the communication link in which a first access point transmits is equal to or more than a predetermined capture threshold if a second access point transmits concurrently with the first access point among the nodes disposed on the transmission paths, the second access point determines that the packet can be concurrently transmitted, and the expected transmitted count for the communication link in which the second access point transmits is multiplied by a constant smaller than 1 to calculate the expected transmission value.

The constant may be ½, the forward transmission success rate and the backward transmission success rate for each communication link may be calculated by the node configuring the communication link, and the sender may receive the expected transmission counts from the nodes to calculate the expected transmission value.

Another exemplary embodiment of the present invention provides a wireless mesh network system including a sender, a receiver, and a plurality of access points disposed between the sender and the receiver: wherein, available transmission paths between the sender and the receiver are determined when the sender intends to send a packet to the receiver; expected transmission values are calculated for the transmission paths when there are two or more available transmission paths; a transmission path having a minimum expected transmission value among the transmission paths is set as an actual transmission path of the packet; the expected transmission value is a sum of expected transmission counts, the expected transmission count being a reciprocal of multiplication of forward transmission success rate and backward transmission success rate of a communication link between the nodes disposed on the transmission paths—the node means the sender, the receiver, or the access point—; and when a signal to interference plus noise ratio (SINR) value of the communication link in which a first access point transmits is equal to or more than a predetermined capture threshold if a second access point transmits concurrently with the first access point among the nodes disposed on the transmission paths, the second access point determines that the packet can be concurrently transmitted, and the expected transmitted count for the communication link in which the second access point transmits is multiplied by a constant smaller than 1 to calculate the expected transmission value.

Other features and aspects will be apparent from the following detailed description, the drawings, and the claims.

DETAILED DESCRIPTION OF EMBODIMENTS

Figure 1A:
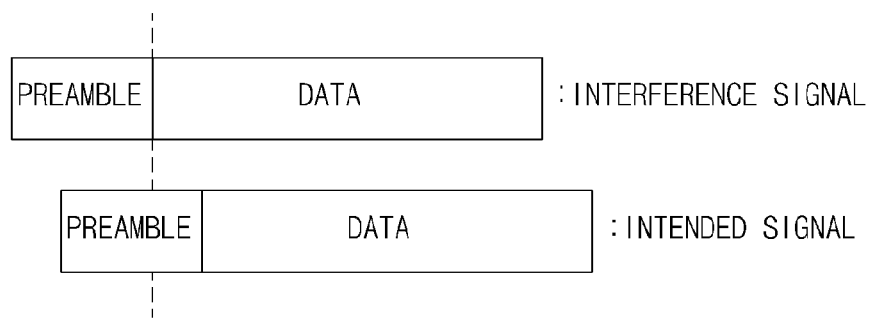
FIGS. 1A and 1B are diagrams showing transmission schedules of PHY capture and MIM capture, respectively.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
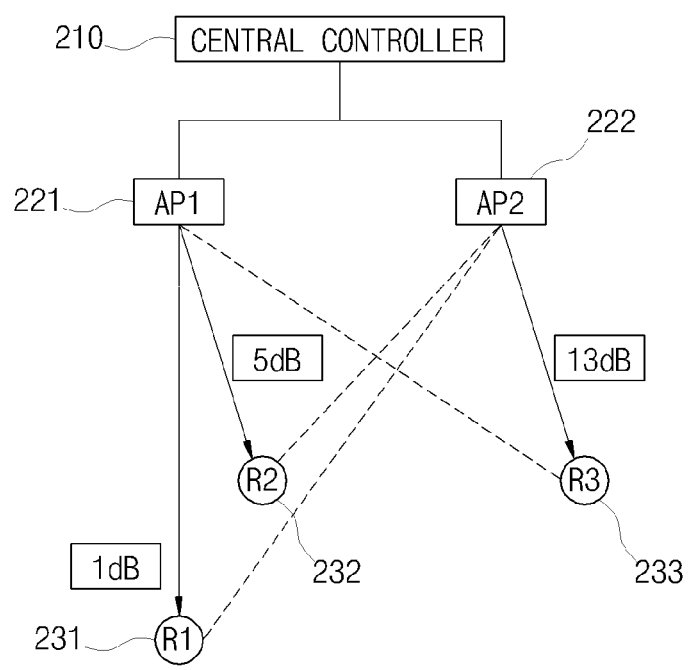
FIG. 2 is a diagram showing an operation of a WLAN system according to an exemplary embodiment of the present invention.

FIG. 2 is a diagram showing a WLAN system to which an opportunistic concurrent transmission method is applied according to an exemplary embodiment of the present invention.

As shown in FIG. 2, the WLAN system according to the exemplary embodiment of the present invention includes a central controller 210, two access points (APs) AP1; 221 and AP2; 222, and client devices R1; 231, R2; 232, and R3; 233 connected to each AP, respectively. Both APs are located within the transmission range of each other. Though two APs and three client devices are shown in FIG. 2 for better comprehension and ease of description, the numbers of APs and the client devices are not necessarily limited thereto.

In the figure, solid arrows mean a transmission link between an AP and a client device, and dashed lines denote interferences among concurrent transmissions. The value in a box indicates received SINR when packets are transmitted concurrently. That is, the clients R1 and R2 are associated with AP1 and a signal transmitted from AP2 becomes an interference signal for R1 and R2. On the contrary, the client R3 is associated with AP2 and, as a result, a signal transmitted from AP1 becomes the interference signal for R3. When concurrent transmission is made from AP1 and AP2, R1, R2, and R3 receive signals having SINRs of 1 dB, 5 dB, and 13 dB, respectively.

Figure 1B:
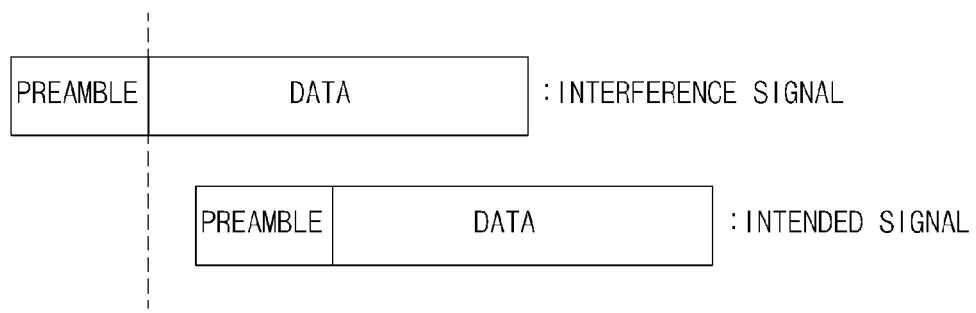

AP1 and AP2 may transmit concurrently by referring to an interference map. The interference map is a table of relative signal strength of each transmission depending on the transmission orders. In the exemplary embodiment shown in FIG. 1, the central controller 210 makes interference map from the individual report of each AP and distributes it to all APs. However, there are lots of schemes that make an interference map without a central controller.

Hereinafter, an opportunistic concurrent transmission method according to the exemplary embodiment of the present invention will be described referring to FIG. 2. It is assumed that each of AP1 and AP2 has packets to transmit to its associated clients R1 and R3, respectively.

Let AP1 transmit a packet to R1 first, and AP2 transmit a packet to R3 after the preamble time of the AP1's packet. AP1's transmission may result in a collision and cannot be decoded successfully by R1 since the SINR value (1 dB) of the received signal does not satisfy the capture threshold (4 dB). Of course, AP2's transmission may succeed due to a higher SINR value of 13 dB.

Now, let us change the transmission link. If AP1 transmits a packet to R2 not to R1, then a following concurrent transmission of AP2 may not corrupt the AP1's packet. The reason is that SINR value of R2 (5 dB) is higher than the capture threshold (4 dB).

Consequently, AP2 has an opportunity to transmit a packet concurrently with AP1 when AP1 send a packet to R2. AP2 can overhear the transmission of AP1 and knows which link is used in this transmission by sniffing the MAC header of the ongoing packet. Referring the interference map, AP2 knows that its concurrent transmission will not destroy the ongoing transmission of AP1. That is, AP2 assures its concurrent transmission satisfy the required SINR thresholds for capturing both packets.

When it is determined that the concurrent transmission will cause a problem, that is, when it is determined that the transmission of another AP will fail by the concurrent transmission, the AP defers its own transmission as a standard DCF operation.

Figure 3:
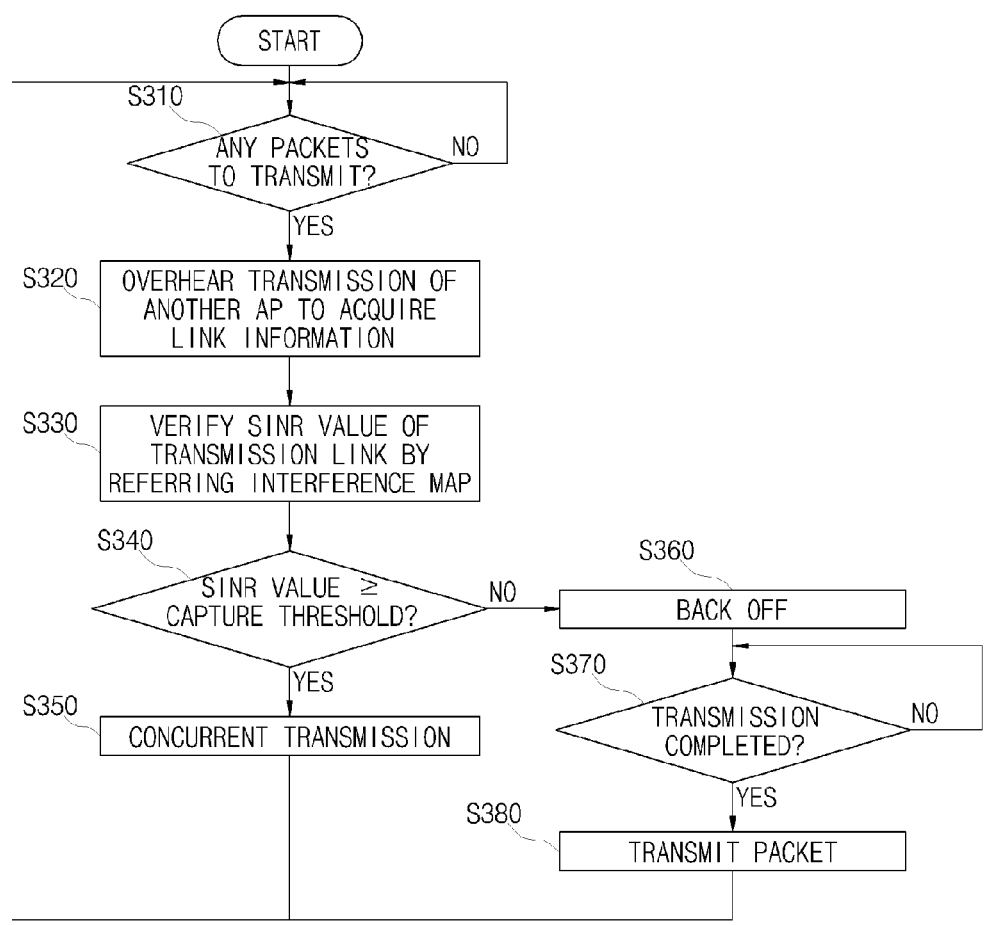
FIG. 3 is a flowchart showing an opportunistic concurrent transmission method from a viewpoint of one AP according to an exemplary embodiment of the present invention.

FIG. 3 is a flowchart showing an opportunistic concurrent transmission method from a viewpoint of one AP according to an exemplary embodiment of the present invention.

First, an AP determines whether there are packets to be transmitted (S310). If so, the AP overhears transmission from another AP to acquire information on a transmission link (S320). Next, AP finds out the SINR value for the transmission link by referring to the interference map (S330). If the SINR value is equal to or higher than the capture threshold (S340), the AP transmits its packets concurrently (S350). If the SINR value is lower than the capture threshold (S340), the AP enters the back off period (S360) and waits for the transmission to be completed. When the transmission in completed (S370), the AP transmits its own packets (S380).

Figure 4A:
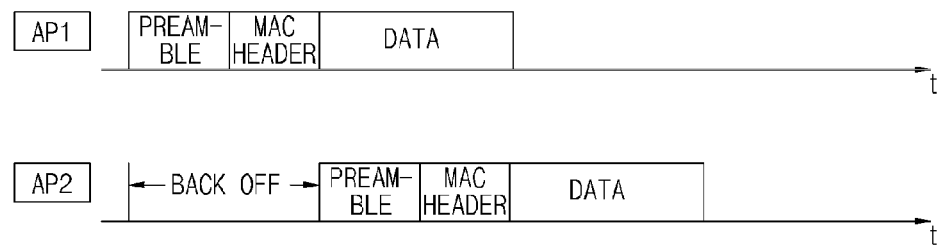
FIGS. 4A and 4B are diagrams showing frame schedules in a case of concurrent transmission and in an opposite case of non-concurrent transmission method according to the exemplary embodiment of the present invention, respectively.
Figure 4B:
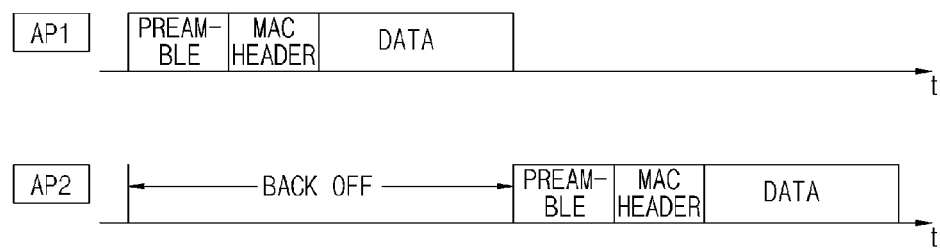

FIGS. 4A and 4B shows timings of the opportunistic concurrent transmission and non-concurrent transmission, respectively.

FIG. 4A shows the case of concurrent transmission. While AP1 is transmitting a frame, AP2 determines whether concurrent transmission can be made through a MAC header of the frame being transmitted by AP1 and the interference map. If AP2 determines to transmit concurrently, AP2 transmits its own frame right away.

On the contrary, FIG. 4B shows the case in which it is determined that concurrent transmission is not made. When AP2 overhears the transmission of AP1 and determines that concurrent transmission is not made, AP2 waits until the transmission of AP1 is completed and transmits its own frame later.

Meanwhile, as described above, the opportunistic concurrent transmission according to the exemplary embodiment of the present invention can operate according to the above described method in a broadcast environment without an ACK frame, but requires a more complicated schedule when an ACK frame is used for receipt notification in a unicast environment. Still, the frame scheduling may also be performed with reference to the MAC header. Since the AP may get to know the transmission time of the ACK frame by referring the MAC header of the transmitting packet from another AP, the AP can schedule the transmission of its own packet not to be overlapped with the ACK frame of the transmitting packet from another AP.

According to the exemplary embodiment of the present invention, the concurrent transmission method as described above is used for routing for the wireless mesh network.

Each node between a sender and a receiver in the wireless mesh network transfers a packet received via one or more hop to a neighboring node within the range of a wireless transmission. In this case, a path capable of transferring the packet between the sender and the receiver may be in plural and a throughput of the entire network varies according to the path in which the packet is taking. Thus, it is important to choose an efficient path of packet transmission. An expected transmission count (ETX) value is used for routing. The ETX is disclosed in Couto DSJD et al., A high throughput path metric for multi-hop wireless routing, Mobicom03.

Figure 5:
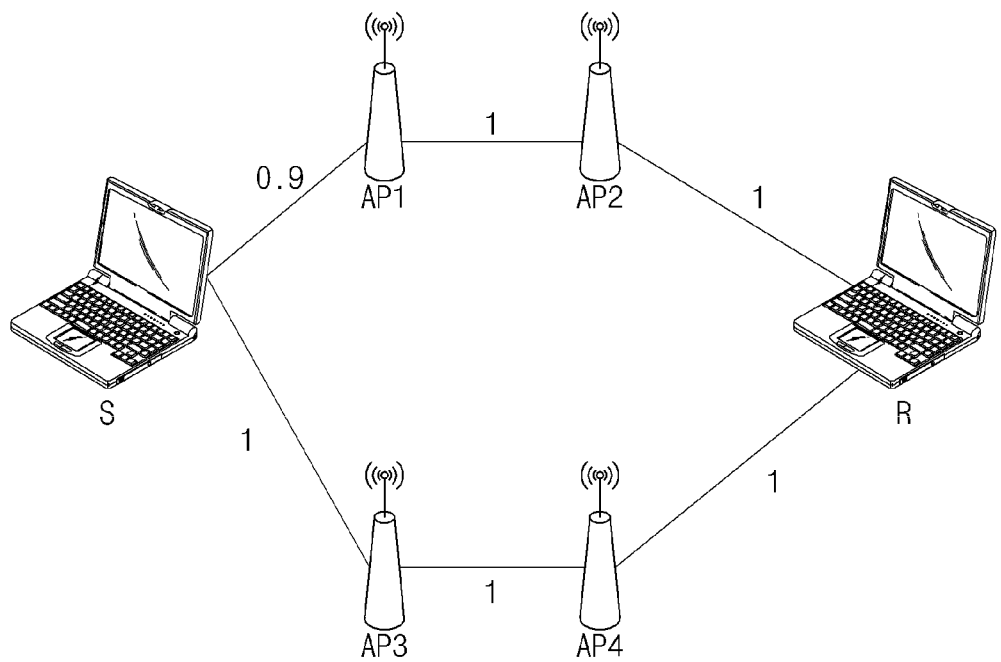
FIG. 5 is a schematic diagram illustrating an example of a wireless mesh network in order to explain a process of calculating an EXT value for routing for a wireless mesh network.

Hereinafter, a process of calculating the ETX value for routing in the wireless mesh network will be described with reference to FIG. 5. FIG. 5 is a schematic example of the wireless mesh network in order to describe the calculation of the ETX value. In FIG. 5, S represents a sender, R represents a receiver, and AP1, AP2, AP3, and AP4 represents access points. A connection line connecting each node (the sender, receiver, and access points) is a communication link and a number marked on each communication link means transmission success rate for each communication link. For ease of description, it is assumed that forward transmission success rate and backward transmission success rate are the same as each other.

The ETX is a method of calculating a path targeting the wireless mesh network, and an expected value for how many times the transmission is performed for successful transmission is calculated with respect to each communication link. The ETX for one link is defined as the following Equation 1.

$$ETX = \frac{1}{d_f \times d_r} \quad \text{[Equation 1]}$$

Herein, df means transmission success rate for a forward direction, and dr means transmission success rate for a backward direction. For example, as shown in FIG. 5, since the transmission success rate is 0.9 (forward and backward) in the communication link between the sender S and the AP1, the ETX becomes 1/(0.9*0.9)=1.234.

A sum of the ETXs for each link included in the path is a cost for the entire path and it is represented by the following Equation 2.

$$PATH_{Cost} = \sum_{i=1}^{n} ETX \quad \text{[Equation 2]}$$

As shown in FIG. 5, there are two different paths between the sender S and the receiver R. A first path PATH1 is S->AP1->AP2->R and a second path PATH2 is S->AP3->AP4->R. ETX values for two paths are calculated as the following Equation 3 and Equation 4, respectively. In this case, a respective ETX value for each communication link may be calculated by each node and the sender may acquire the entire ETX value by combining the calculated result.

$$PATH1: \Sigma ETX = \frac{1}{0.9 \times 0.9} + \frac{1}{1 \times 1} + \frac{1}{1 \times 1} \approx 3.234 \quad \text{[Equation 3]}$$

$$PATH2: \Sigma ETX = \frac{1}{1 \times 1} + \frac{1}{1 \times 1} + \frac{1}{1 \times 1} = 3 \quad \text{[Equation 4]}$$

According to the results calculated by Equation 3 and Equation 4, the sender S determines the PATH2, which has a smaller ETX value, as a better path and selects the PATH2.

However, a different result may come out considering concurrent transmission.

Figure 6:
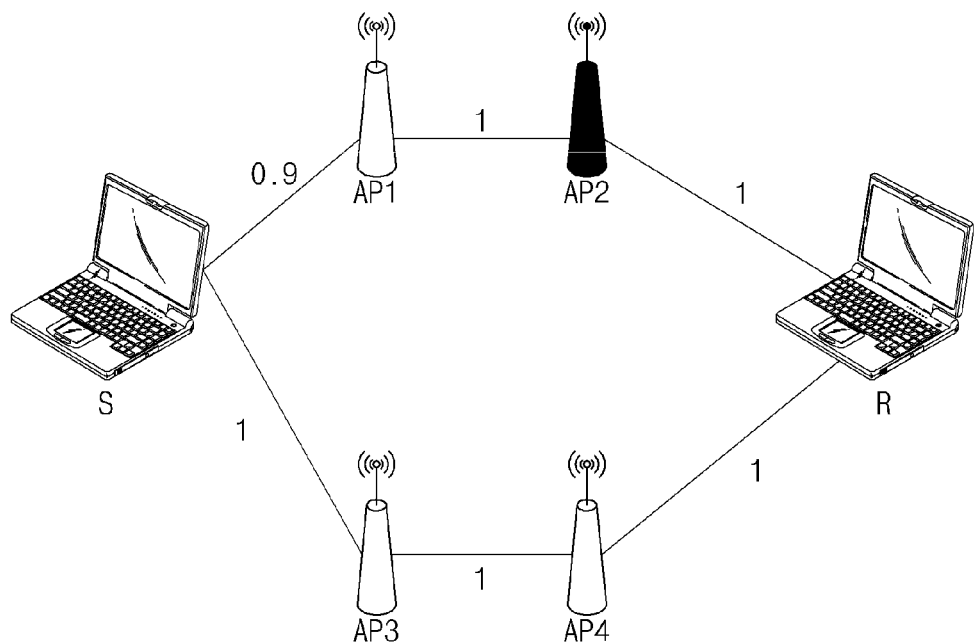
FIG. 6 is a diagram illustrating an example of a wireless mesh network system using a routing method according to an exemplary embodiment of the present invention.

FIG. 6 shows an example of a wireless mesh network system using a routing method according to an exemplary embodiment of the present invention.

In FIG. 6, it is assumed that the AP2 can perform the concurrent transmission using an MIM function during the transmission from the AP1 under the same condition. In this case, the ETX value can be reduced with respect to a link capable of MIM, and, for example, the ETX value may be reduced by half. Accordingly, a transmission expected value of each path changes. This is represented by the following Equation 5 and Equation 6, and since the ETX value is calculated by considering the MIM concurrent transmission, the expected value is represented by ETX+MIM. Even in this case, considering the concurrent transmission, an ETX+MIM value for each communication link may be calculated by each node and the sender may acquire the entire ETX+MIM value by combining the calculated result.

$$PATH1: \Sigma(ETX + MIM) = \quad \text{[Equation 5]}$$
$$\frac{1}{0.9 \times 0.9} + \frac{1}{1 \times 1} + \frac{1}{1 \times 1} \times \frac{1}{2} \approx 2.834$$

$$PATH2: \Sigma(ETX + MIM) = \frac{1}{1 \times 1} + \frac{1}{1 \times 1} + \frac{1}{1 \times 1} = 3 \quad \text{[Equation 6]}$$

As described above, if the ETX value is calculated taking the concurrent transmission into consideration, as shown in Equation 5 and Equation 6, the sender S determines the PATH1 as a better routing path and selects the PATH1, such that a transmission throughput of the entire system increases.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A routing method for a sender for transmitting a packet in a wireless mesh network including the sender, a receiver, and a plurality of access points disposed between the sender and the receiver, the method comprising:
    determining available transmission paths between the sender and the receiver;
    calculating expected transmission values for the available transmission paths if there are two or more available transmission paths; and
    setting a transmission path having a minimum expected transmission value among the available transmission paths as an actual transmission path of the packet,
    wherein each of the expected transmission values is determined by a sum of expected transmission count values, an expected transmission count value being a reciprocal of multiplication of a forward transmission success rate and a backward transmission success rate of a communication link between two nodes disposed on an available transmission path, a node being the sender, the receiver, or an access point, and
    wherein, when a signal to interference plus noise ratio (SINR) value of a communication link in which a first access point transmits the packet is equal to or greater than a predetermined capture threshold, a second access point determines that the packet can be concurrently transmitted, and an expected transmission count value for a communication link in which the second access point transmits the packet is multiplied by a constant value smaller than 1 to calculate a corresponding expected transmission value, the first and second access points being nodes disposed on an available transmission path.

2. The method of claim 1, wherein the constant value is ½.

3. The method of claim 1, wherein a forward transmission success rate and a backward transmission success rate for each communication link are calculated by nodes configuring the communication link.

4. The method of claim 1, wherein the sender receives the expected transmission count values from nodes disposed on the available transmission paths to calculate the expected transmission values for the available transmission paths.

5. A wireless mesh network system, comprising:
    a sender;
    a receiver; and
    a plurality of access points disposed between the sender and the receiver, wherein:
    available transmission paths between the sender and the receiver are determined when the sender is to send a packet to the receiver;
    expected transmission values are calculated for the available transmission paths when there are two or more available transmission paths;
    a transmission path having a minimum expected transmission value among the transmission paths is set as an actual transmission path of the packet;
    an expected transmission value is determined by a sum of expected transmission count values, an expected transmission count value being a reciprocal of multiplication of a forward transmission success rate and a backward transmission success rate of a communication link between two nodes disposed on an available transmission path, a node being the sender, the receiver, or an access point; and
    when a signal to interference plus noise ratio (SINR) value of a communication link in which a first access point transmits the packet is equal to or greater than a predetermined capture threshold, a second access point determines that the packet can be concurrently transmitted, and an expected transmission count value for the communication link in which the second access point transmits the packet is multiplied by a constant value smaller than 1 to calculate a corresponding expected transmission value, the first and second access points being nodes disposed on an available transmission path.

6. The system of claim 5, wherein the constant value is ½.

* * * * *